US007559482B2

(12) United States Patent
Coveley

(10) Patent No.: US 7,559,482 B2
(45) Date of Patent: Jul. 14, 2009

(54) SUPPLEMENTARY ANTENNA FOR RADIO FREQUENCY IDENTIFICATION AND PRODUCT CONTAINING UNIT INCORPORATING SAME

(75) Inventor: Michael E. Coveley, Richmond Hill (CA)

(73) Assignee: cStar Technologies Inc, (CA)

( * ) Notice: Subject to any disclaimer, the term of this patent is extended or adjusted under 35 U.S.C. 154(b) by 273 days.

(21) Appl. No.: 11/179,337

(22) Filed: Jul. 11, 2005

(65) Prior Publication Data

US 2006/0028392 A1 Feb. 9, 2006

Related U.S. Application Data

(60) Provisional application No. 60/586,798, filed on Jul. 9, 2004.

(51) Int. Cl.
*G06K 19/06* (2006.01)
(52) U.S. Cl. .................. 235/492; 235/375; 235/380; 340/572.1; 340/572.7; 340/572.8
(58) Field of Classification Search ................. 235/492, 235/375, 380; 340/572.1, 572.7, 572.8
See application file for complete search history.

(56) References Cited

U.S. PATENT DOCUMENTS

| 2002/0158752 | A1* | 10/2002 | Steele et al. | 340/10.4 |
|---|---|---|---|---|
| 2002/0183611 | A1* | 12/2002 | Fishbein et al. | 600/410 |
| 2004/0201539 | A1* | 10/2004 | Yewen | 343/867 |
| 2005/0040934 | A1* | 2/2005 | Shanton | 340/5.92 |
| 2005/0184149 | A1* | 8/2005 | Auchinleck | 235/385 |
| 2006/0097874 | A1* | 5/2006 | Salesky et al. | 340/572.1 |
| 2006/0267777 | A1* | 11/2006 | Moore | 340/572.8 |

* cited by examiner

*Primary Examiner*—Allyson N Trail
(74) *Attorney, Agent, or Firm*—Beyer Law Group LLP

(57) ABSTRACT

A product dispensing unit comprises a housing, at least one main balun antenna within the housing and at least one product holder within the housing. The at least one product holder holds RFID tagged product to be dispensed from the housing. At least one supplementary antenna is positioned adjacent the product holder to cause RFID tags on the product to oscillate when excited by the main balun antenna.

46 Claims, 14 Drawing Sheets

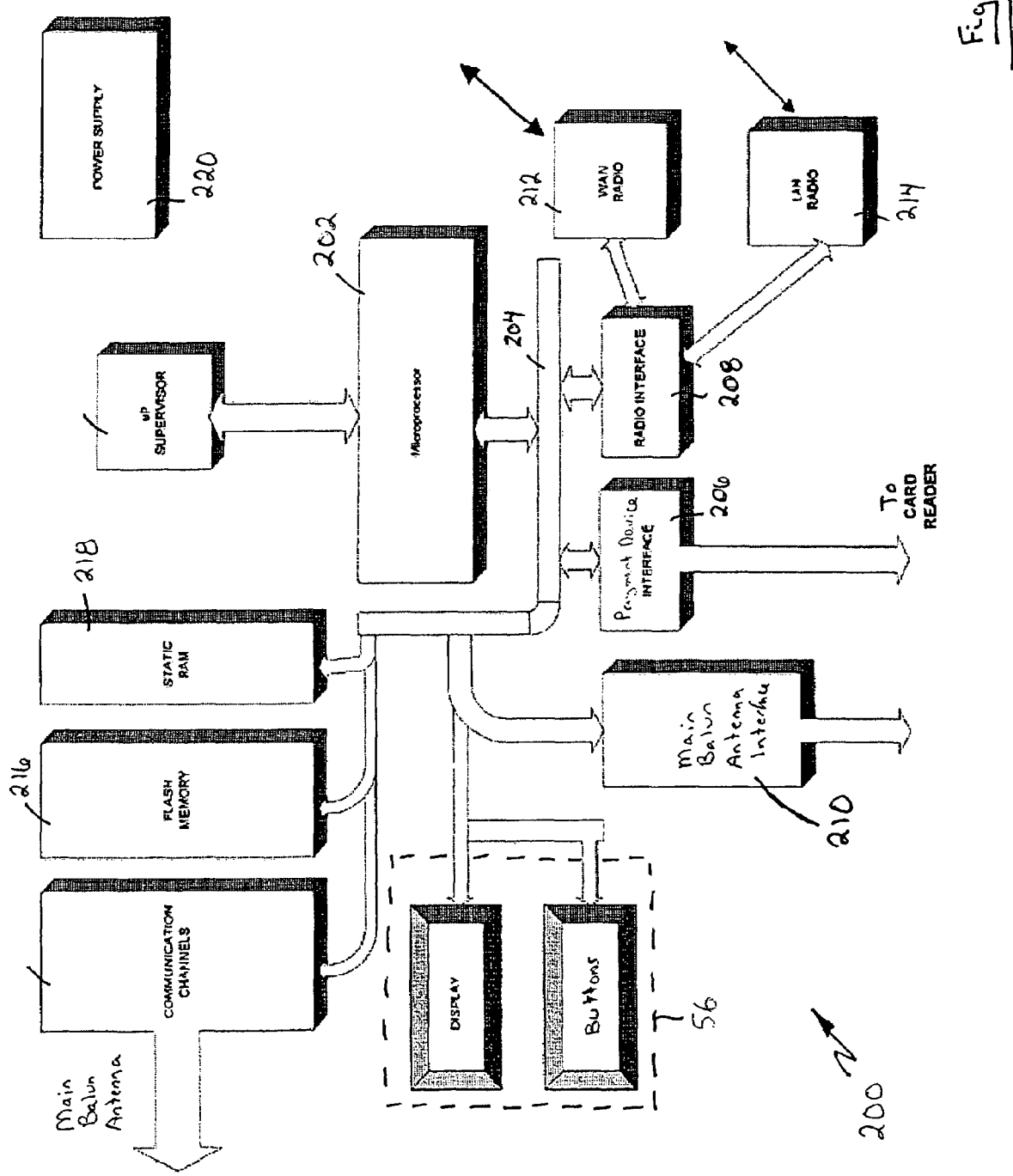

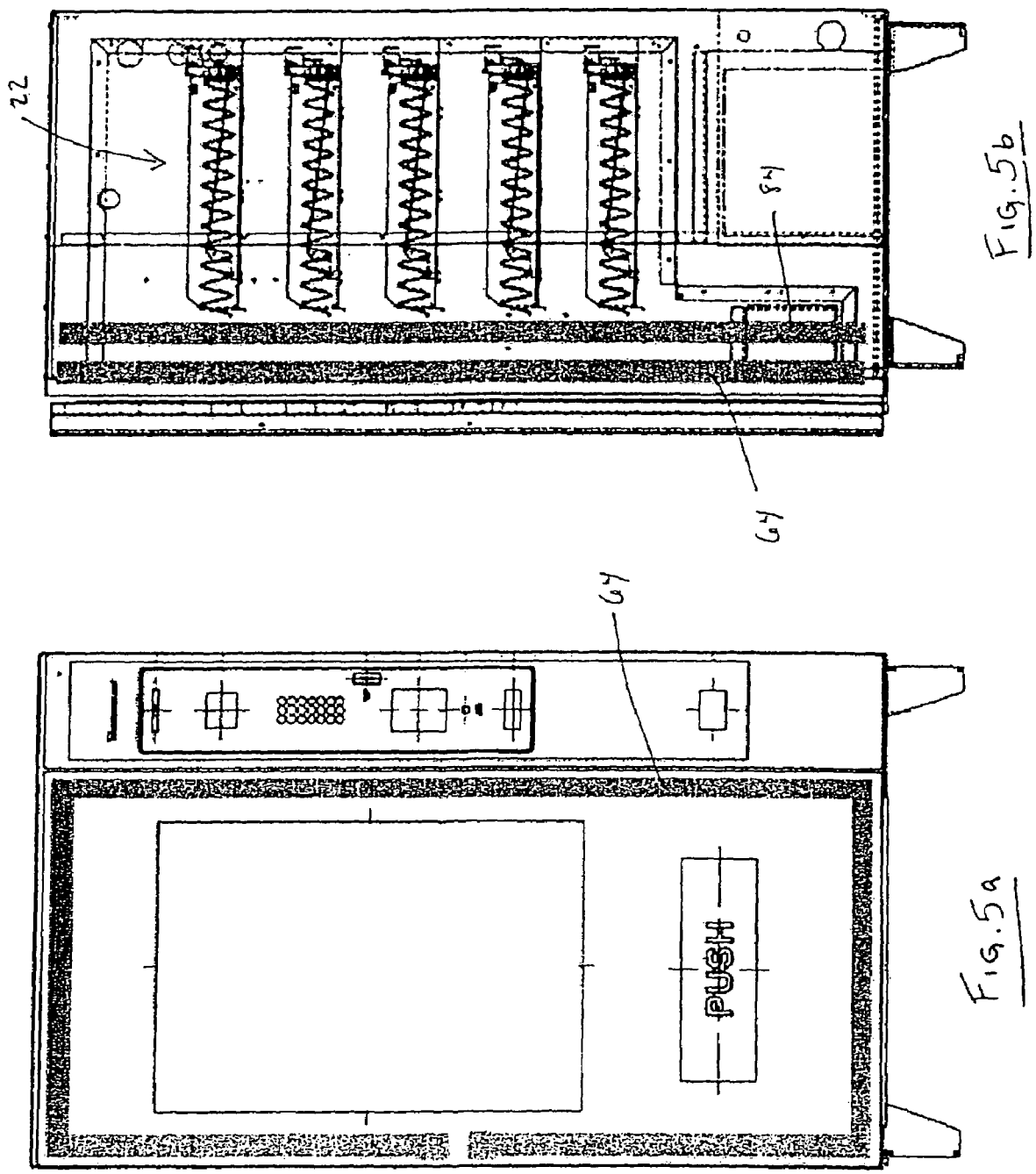

SUPPLEMENTARY ANTENNA FOR RADIO FREQUENCY IDENTIFICATION AND PRODUCT CONTAINING UNIT INCORPORATING SAME

RELATED APPLICATIONS

This application claims the benefit of U.S. Provisional Patent Application Ser. No. 60/586,798 on Jul. 9, 2004 for an invention entitled "Supplementary Antenna For Radio Frequency Identification," which is hereby incorporated herein by reference.

FIELD OF THE INVENTION

The present invention relates generally to inventory management and, more particularly, to a supplementary antenna for radio frequency identification, to a system and method for tracking inventory and to a product containing unit incorporating at least one supplementary antenna.

BACKGROUND OF THE INVENTION

Inventory control is a primary concern for product retailers so that excess and insufficient inventory situations are avoided. Within a mortar and bricks environment, inventory is controlled by counting existing inventory at physical locations. To facilitate this inventory tracking process, it is common to label products with data symbols such as for example bar codes that can be read by an optical scanner. Such optical technology, however, requires line-of-sight ("LOS") between the optical scanner and the data symbols in order for the data symbols to be read. Unless products carrying such data symbols are well-aligned, automated reading of these data symbols is difficult to accomplish making the inventory tracking process onerous and time consuming.

In more recent years, radio frequency identification ("RFID") tags have become commercially viable and have been used to replace data symbols in a number of applications. RFID tags provide the advantage in that a line of sight to the RFID tags is not required to read the RFID tags. Although the use of RFID tags provides this advantage over data symbols, problems exist with RFID tags. For example, increased distance between an RFID reader, also known as a balanced/unbalanced "balun" antenna, and the RFID tags adversely effects signal strength and reliability. As a result, it is often necessary to ensure the RFID reader is in close proximity to the products carrying the RFID tags in order for the RFID tags to be read. Depending on the environment, bringing the RFID reader into close proximity with the RFID tags can be a challenging task.

Also, even though a line of sight to RFID tags is not necessarily required to read the RFID tags, in some environments the use of RFID tags to label products has still proven to be ineffective. For example, when RFID tagged products are packed in boxes, cartons, vending machines or other product containing units, the product containing units are often "impenetrable" to the RFID reader. If the size of the product containing unit is large, some of the RFID tagged products may be simply out of range of the RFID reader. If the product containing unit holds a significant number of RFID tagged products that are tightly packed, proximate RFID tags may cancel one another out during reading ("referred to commonly as "metalizing"), inhibiting the RFID tags from being read. If the product containing unit includes or contains certain metals or contains certain liquids, the effective range of the RFID reader can be significantly reduced making reading of the RFID tags virtually impossible. As will be appreciated, the only way to track inventory in such environments is to open the product containing units, which of course is highly undesirable.

Whether using data symbols or RFID tags to label products, it will be appreciated that controlling inventory by scanning or reading the labeled products is much more difficult and in fact impractical in environments where inventory is dispensed through stocked vending or dispensing machines that are distributed over a large geographical area.

To deal with inventory control in these environments, service personnel are typically dispatched along service routes according to pre-set schedules so that the vending machines can be checked for inventory levels and proper operation. As will be appreciated, during a service route all vending machines along the service route are checked. In many instances, the checks reveal that the vending machines are operating properly and hold sufficient inventory. As a result, the checks are unnecessary. In other instances, the checks reveal that the vending machines have malfunctioned and/or are depleted of inventory, resulting in potential lost sales especially if delays exist between checks.

Also, in the case of vending machines it has in the past been difficult to confirm that transactions have been successfully completed. In some instances products are not properly dispensed even though they have been paid for. To deal with this problem, multi-faceted arrays have been incorporated into vending machines to sense the dispensation of product. While such multi-faceted arrays allow situations where paid for products are not properly dispensed to be detected, they are expensive and have proven to be only somewhat reliable.

In the medical supply environment, medical, surgical, biological and/or pharmaceutical supplies are stored in refrigerated dispensing units distributed throughout medical, research and/or educational facilities located at different geographical locations. In the past, dispatching medical supplies through these refrigerated dispensing units has been based on the honor system. Users removing supplies from refrigerated dispensing units are expected to list the removed supplies on charts posted on the refrigerated dispensing units so that supply usage can be tracked and costs assigned in the appropriate manner.

As will be appreciated, inventory control in this medical supply environment suffers similar problems to those encountered in the vending machine environment discussed above. Routine checks of all refrigerated dispensing units must be carried out to determine the inventory level and operating status of the refrigerated dispensing units. In many cases the checks are either unnecessary or late. The latter condition can be particularly problematic in the case where a refrigerated dispensing unit fails and the temperature within the refrigerated dispending unit rises to a point where the inventory is spoiled. Inventory shrinkage is also a problem in the medical supply environment. In many instances, users removing supplies from the refrigerated dispensing units fail to record accurately the removed items. As a result, costs for the missing inventory cannot be assigned. As will be appreciated, improvements in inventory control in environments where product is not readily accessible are desired.

It is therefore an object of the present invention to provide a novel supplementary antenna for radio frequency identification, to a system and method for tracking inventory and to a product containing unit including at least one supplementary antenna.

SUMMARY OF THE INVENTION

Accordingly, in one aspect, there is provided a supplementary antenna for placement in a product containing unit including at least one RFID tagged product, comprising: an antenna wire; and an adjustable capacitor coupled to the antenna wire, the supplementary antenna oscillating when subjected to an RFID interrogation field, oscillation of the supplementary antenna causing the RFID tags to oscillate.

According to another aspect there is provided a product dispensing unit comprising: a housing; at least one main balun antenna within the housing; at least one product holder within the housing, the at least one product holder holding RFID tagged product to be dispensed from the housing; and at least one supplementary antenna positioned adjacent the product holder to cause RFID tags on the product to oscillate when excited by the main balun antenna.

According to another aspect, there is provided a product containing unit defining an enclosure and storing products having RFID tags, the enclosure including a supplementary antenna, the supplementary antenna oscillating when subjected to an RFID interrogation field, oscillation of the supplementary antenna causing the RFID tags to oscillate.

The supplementary antenna provides advantages in that it enables the tracking of product vending and product inventory in inaccessible locations to be enhanced. The ability to locate inaccessible inventory is especially advantageous in situations where the inventory has a finite shelf life and/or in situations where product recalls occur. In addition, the supplementary antenna enables the location of product to be tracked from end-to-end. Since product dispensation can be readily detected in product dispensing unit environments, automated billing and replenishment ordering is achievable.

BRIEF DESCRIPTION OF THE DRAWINGS

Embodiments will now be described, more fully, with reference to the accompanying drawings, in which:

FIG. 1b is a side cross-sectional view of the product dispensing unit of FIG. 1a;

FIG. 2a is a perspective view of a supplementary antenna used in the product dispensing unit of FIG. 1a;

FIG. 2b is a schematic block diagram of a processing unit used in the product dispensing unit of FIG. 1a;

FIGS. 5a and 5b are front and side cross-sectional views of yet another embodiment of a product dispensing unit;

DETAILED DESCRIPTION OF THE EMBODIMENTS

A supplementary antenna for use in a product dispensing/containing unit includes an antenna coupled to a re-polarizing semi-balanced/unbalanced ("balun") inductance-capacitance ("L/C") circuit. When the supplementary antenna is placed in a product containing unit holding products carrying RFID tags that are otherwise generally inaccessible to RFID interrogation, the supplementary antenna induces RFID tag data communications back to a main reading balun antenna irrespective of the RFID tag orientation thereby to enhance coupling of the main balun antenna to the RFID tags.

When the supplementary antenna is placed in a storage unit, such as a refrigerator, product dispensing unit, or shipping container, such as for example a box or carton, the supplementary antenna enhances interrogation of products carrying RFID tags that are contained in the storage unit. In this manner, product inventory can be monitored without requiring physical access to the interior of the storage unit.

Figure 1B:
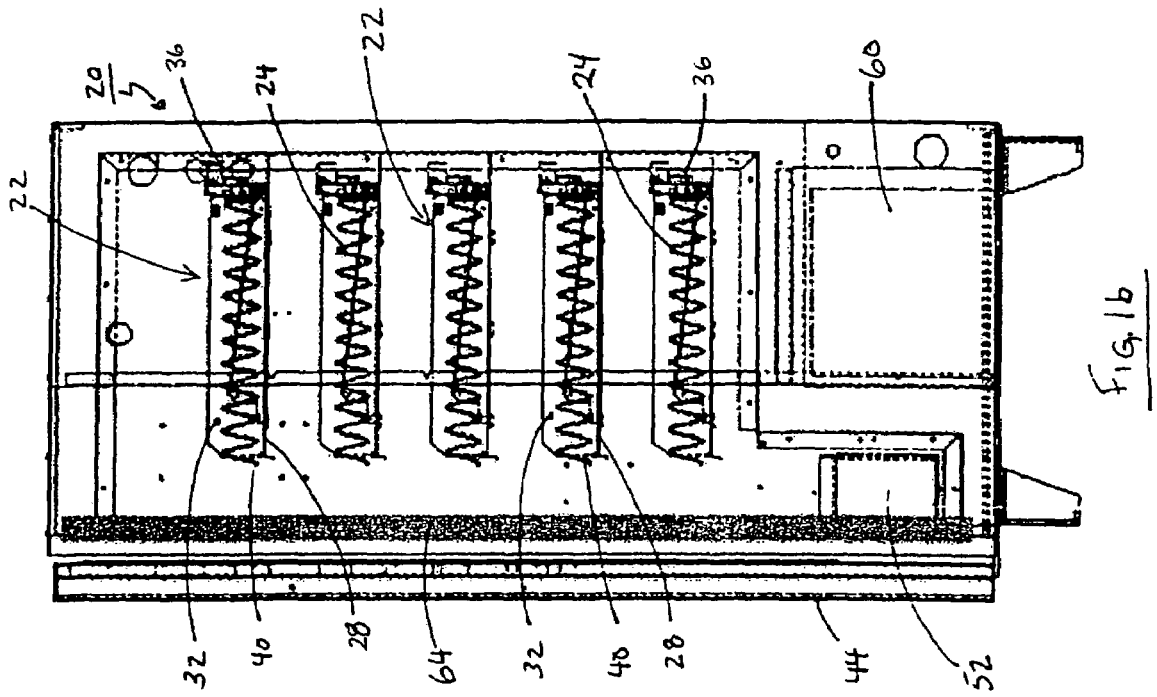
Figure 1A:
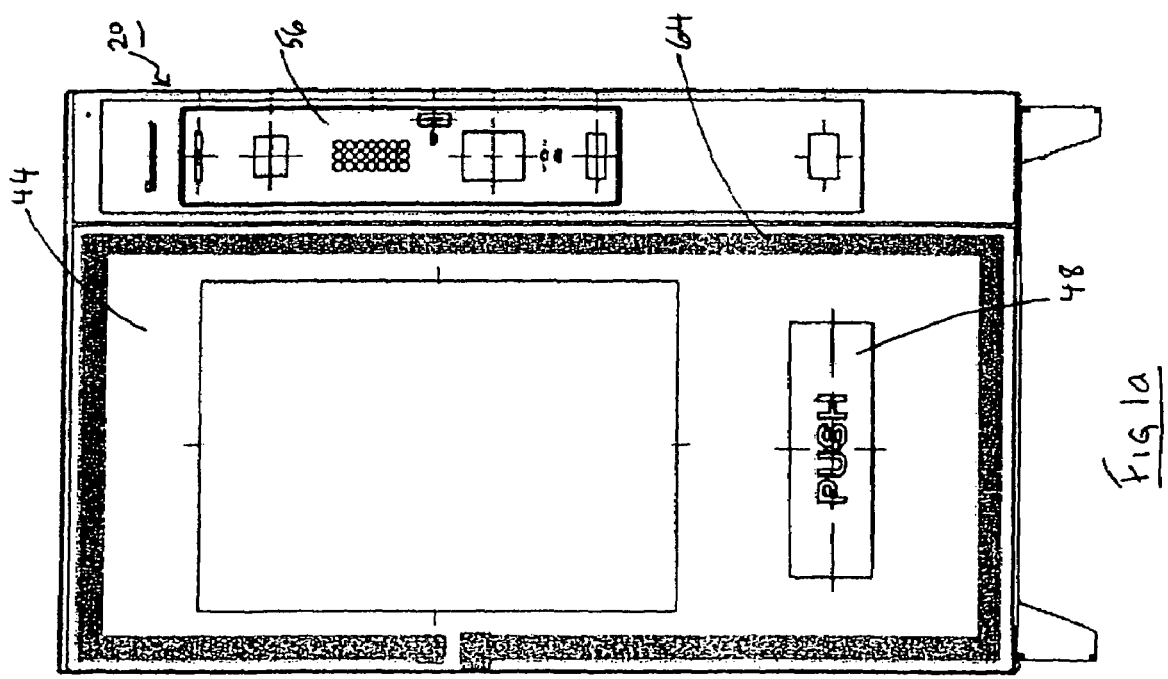
FIG. 1a is a front view of a product dispensing unit incorporating supplementary antennae.

Turning now to FIGS. 1a and 1b, a product dispensing unit having a plurality of vertically spaced shelf assemblies 22 for holding products is shown and is generally identified by reference numeral 20. The shelf assemblies 22 employ a plurality of product discharge spirals 24 that double as multiplexed supplementary antennas. Guide shelves 28 are located below each discharge spiral 24 and guide rails 32 are positioned along each side of the discharge spirals 24 to guide products positioned thereon (not shown). Neither the discharge spirals 24 nor the guide shelves 28 extend fully to the front of the product dispensing unit 20. The rear ends of the discharge spirals 24 are coupled to motors 36. The free front distal end of each discharge spiral 24 freely extends beyond its associated guide shelf 28. As is well known, product is placed between the turns of the discharge spirals 24 so that when the discharge spirals are rotated by the motors 36, product is discharged one-by-one from shelf assemblies 22.

Figure 2A:
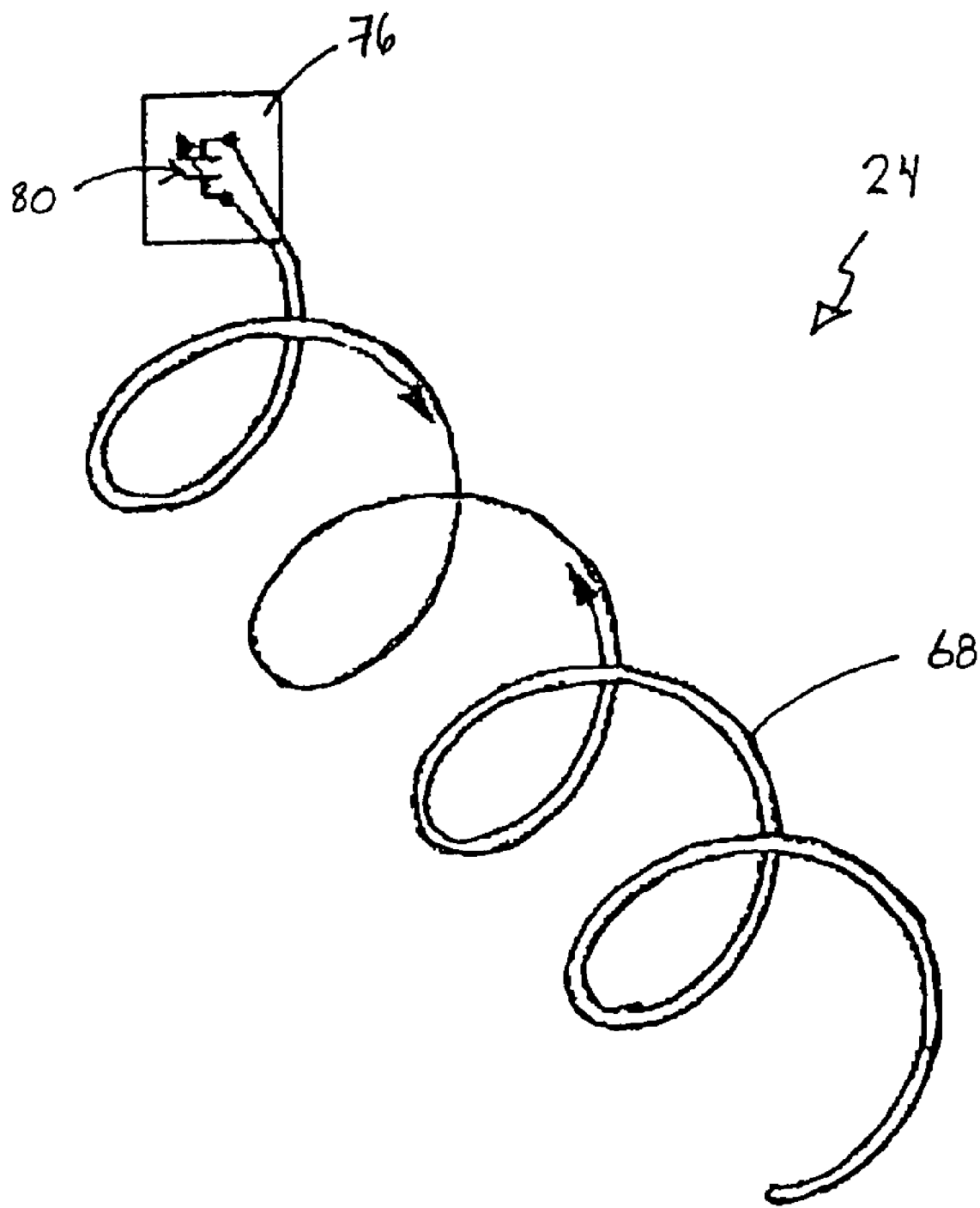

FIG. 2a better illustrates one of the supplementary antenna discharge spirals 24. As can be seen, discharge spiral 24 includes a German tumbled and polished silver wire 68 that is looped back on itself and formed into a spiral configuration. The two ends of the wire 68 are soldered to an adjustable capacitor 80 mounted on a circuit board 76. During production, the adjustable capacitor 80 is tuned to the frequency of the main RFID balun antenna 64. Use of a spiral configuration for the supplementary antenna ensures appropriate power levels.

The product dispensing unit 20 has a main door 44 that provides access to the interior of the product dispensing unit and hence, to the discharge spirals 24 to enable the product dispensing unit 20 to be replenished. A dispensing door 48 is located in the lower portion of the main door 44. A dispensing bin 52 is positioned at the bottom of the product dispensing unit 20 behind the dispensing door 48 allowing the dispensing bin to be accessed via the dispensing door. A control panel 56 is located adjacent the main door 44 and has a number of user actuable buttons, a display panel and one or more payment acceptance devices, such as for example a coin receiving mechanism and/or a payment card reader.

A cooling unit 60 is in the product dispensing unit 20 beneath the lowest shelf assembly 22 to maintain products held in the dispensing machine 20 within a desired temperature range.

A main balun antenna 64 is located about the periphery of the door opening of the product dispensing unit 20 and is coupled to a processing unit 200 (see FIG. 2b). The main balun antenna 64 can be passive or, alternatively, can be active where the application requires a higher degree of accuracy, such as when high-priced products are being distributed. The processing unit 200 includes a central processing unit (CPU) 202 having a real-time clock and executes an anti-collision algorithm that results in the ability to support, detect and interrogate a large number of RFID tags. The CPU communicates with a plurality of interfaces via a databus 204, namely a payment device interface 206, a radio interface 208 and a main balun antenna interface 210. The payment device interface 206 is coupled to the coin receiving mechanism and/or payment card reader. The radio interface 208 is coupled to a wide area network (WAN) radio transceiver 212 and/or to a local area network (LAN) radio transceiver 214. The radio transceivers 212 and 214 are coupled to an antenna thereby to permit wireless communications with a remote site. The remote site may be a storeroom computer located proximate to the product dispensing unit 20 or may be a product supplier's backend server. The balun antenna interface 210 is coupled to the main balun antenna 64.

The CPU 202 further communicates with static random access memory (RAM) 216 and flash memory 218. The control panel 56 is also coupled to the databus 204 and communicates with the CPU 202. An on-board power supply 220 provides the necessary power for operation of the product dispensing unit 20. On-board power supply is coupled to an electrical cord to be plugged into a conventional power supply.

As mentioned above, the turns of each supplementary antenna discharge spiral 24 are loaded with product that are dispensed when appropriate payment has been made and the products are selected by a user via the control panel. Each product placed in the dispensing machine 20 is labeled with an RFID tag. The RFID tags are typically placed on the inside of the product packaging, but can also be placed on the outside of the packaging or located within the packaging itself. More often than not, the products rest on the discharge spirals 24 in a somewhat random orientation. As the RFID tags are typically located along one side of the product packaging, they are not typically consistently oriented. The shape of each supplementary antenna discharge spiral 24 is designed to generate an omni-directional interrogation field in response to an interrogation field propagating from the main balun antenna 64. As a result, the RFID tags are caused to respond to the interrogation field regardless of orientation thereby to enhance coupling between the main balun antenna interrogation field and the product RFID tags.

Since, the product dispensing unit 20 is primarily constructed of metals that interfere with RFID interrogation fields, placement of the supplementary antennas inside the product dispensing unit 20 adjacent the products having the RFID tags avoids much of the interference that would otherwise occur.

During operation, a buyer wishing to obtain product held by the product dispensing unit 20 interacts with the control panel 56 to specify and pay for the product to be purchased. After the product has been selected and paid for either by inserting money into the coin receiving mechanism, by swiping a payment card via the payment card reader or by entering a code using the buttons, such as a department code to which the purchase is to be charged, the motor 36 coupled to the discharge spiral 24 on which the selected product rests is conditioned by the processing unit 200 to rotate the discharge spiral 24. As a result, the products on the discharge spiral 24 are guided forward until the product closest to the free distal end of the discharge spiral 24 is urged past the end of the guide shelf 28. When this occurs, the product cascades into the dispensing bin 52 located thereunder under the influence of gravity. With the product in the dispensing bin 52, the buyer can access the product by urging the dispensing door 48 inwardly and upwardly, thereby granting access to the dispensing bin 52.

After product has been dispensed, the processing unit 200 excites the main balun antenna 64 causing it to generate an RF interrogation field. The RF interrogation field in turn excites the supplementary antenna discharge spirals 24. Once excited, the supplementary antenna discharge spirals 24 generate interrogation fields. In response to the interrogation fields the RFID tags on the products within the product dispensing unit 20 and output RFID tag data. The main antennae balun 64 in turn receives the RFID tag data emitted by the RFIJD tags and conveys the RFID tag data to the processing unit 200. By comparing product inventory before and after product dispensation a record of the transaction can be confirmed. The transaction data is then transmitted to the remote site via the wireless communication link.

By enhancing RFID tag interrogation within the product dispensing unit 20, the supplementary antenna discharge spirals 24 enable the dispensing machine 20 to detect when a transaction has not been completed as a result of the selected product being lodged or caught up on a discharge spiral 24. In addition, in some applications, such as in the medical research field, vials are often placed in light, flimsy envelopes that cascade much like a leaf. Such envelopes have an increased probability of dropping into or atop of another shelf assembly 22 during descent. A rapid inventory can be performed to determine if purchased product has not been properly dispersed thereby allowing a transaction to be noted as incomplete. In such cases, a buyer can be refunded or not charged. Service personnel can also be dispatched to the product dispensing unit location if the failure rate of the product dispensing unit 20 exceeds acceptable levels. Also, if the product lands on another shelf assembly, 22, the processing unit 200 can be conditioned to inhibit that shelf assembly 22 from being selected until service personnel have removed the product from the shelf assembly.

At the remote site, the received transaction data is stored in a database so that an accurate real-time status of the inventory can be maintained. The maintenance of accurate inventory information allows useful sales reports to be generated and allows replenishment schedules to be adjusted to conform to inventory demand without human intervention. Generated reports are posted on encrypted web pages that can be accessed by authorized users via Internet connections. By reading RFID tags prior to delivery, during stocking and after dispensing, the location of each product can be accurately tracked end-to-end.

Figure 3B:
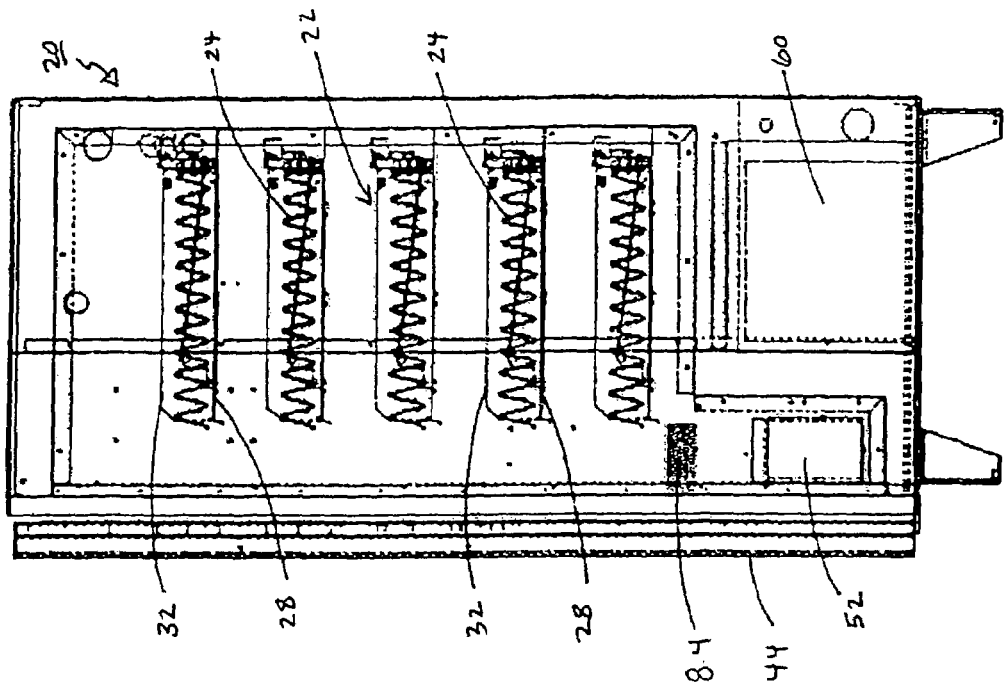
FIGS. 3a and 3b are front and side cross-sectional views of another embodiment of a product dispensing unit.
Figure 3A:
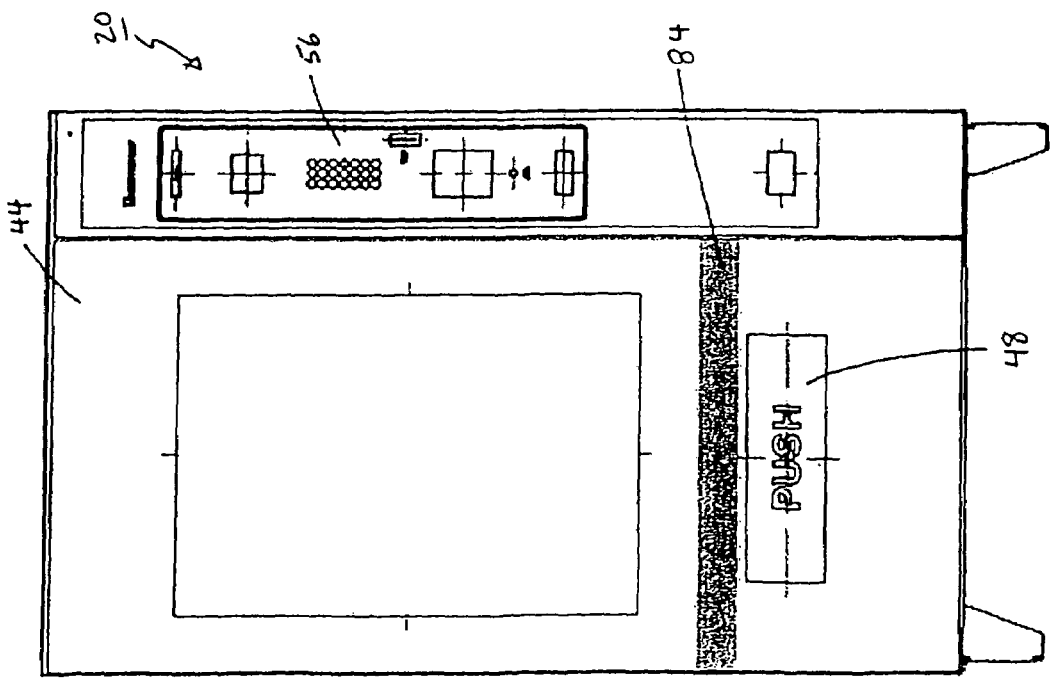
Figure 4:
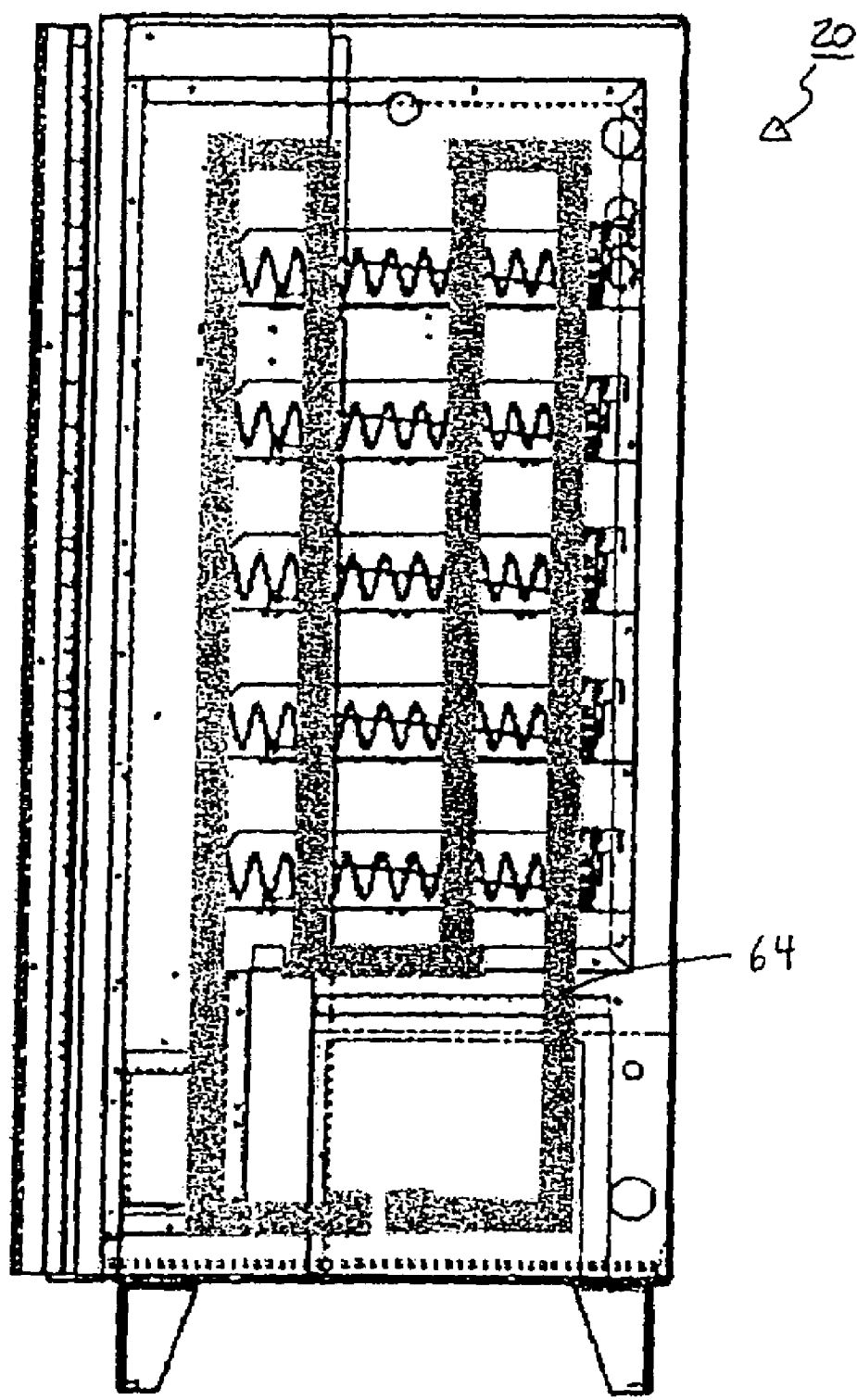
FIG. 4 is another side cross-sectional view of the product dispensing unit of FIGS. 3a and 3b.

FIGS. 3a, 3b and 4 illustrate another embodiment of a product dispensing unit similar to the previous embodiment. In this embodiment the main balun antenna 64 is disposed on the side wall of the product dispensing unit 20. In addition, a complementary balun antenna 84 is provided above the dispensing bin 52 surrounding the path taken by products cascading into the dispensing bin 52. The complementary balun antenna 84 registers dispensed products as they fall through it and before they land in the dispensing bin 52. In addition to the rapid inventory functionality of the discharge spirals 24, as the products fall through the complementary balun antenna 84 and into the dispensing bin 52, they are registered as a confirmed dispensation. In cases where products become lodged or caught up on a discharge spiral, the complementary balun antenna 84 will not detect a dispensation allowing the transaction to be designated as incomplete. In this manner, a higher level of assurance of the completion of a transaction is provided.

FIGS. 5a and 5b illustrate a further embodiment of a product dispensing unit. In this embodiment, the main balun antenna 64 and the complementary balun antenna 84 are disposed about the door frame of the product dispensing unit 20. As the products are removed from the product dispensing unit 20, they are registered by both balun antennas 64, 84. A subtle time delay between balun antenna detections as a product is placed in or withdrawn from the product dispensing unit 20 facilitates determination of the direction of movement of the product. In this manner, restocking and purchasing transactions can be effectively tracked.

Figure 6B:
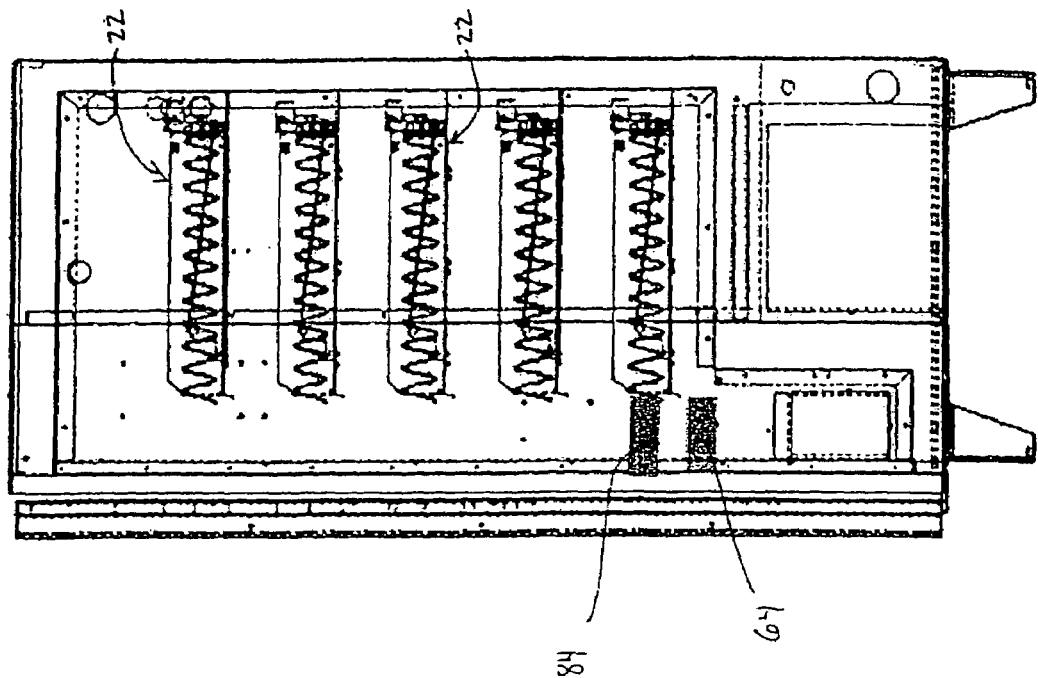
FIGS. 6a and 6b are front and side cross-sectional views of yet another embodiment of a product dispensing unit.
Figure 6A:
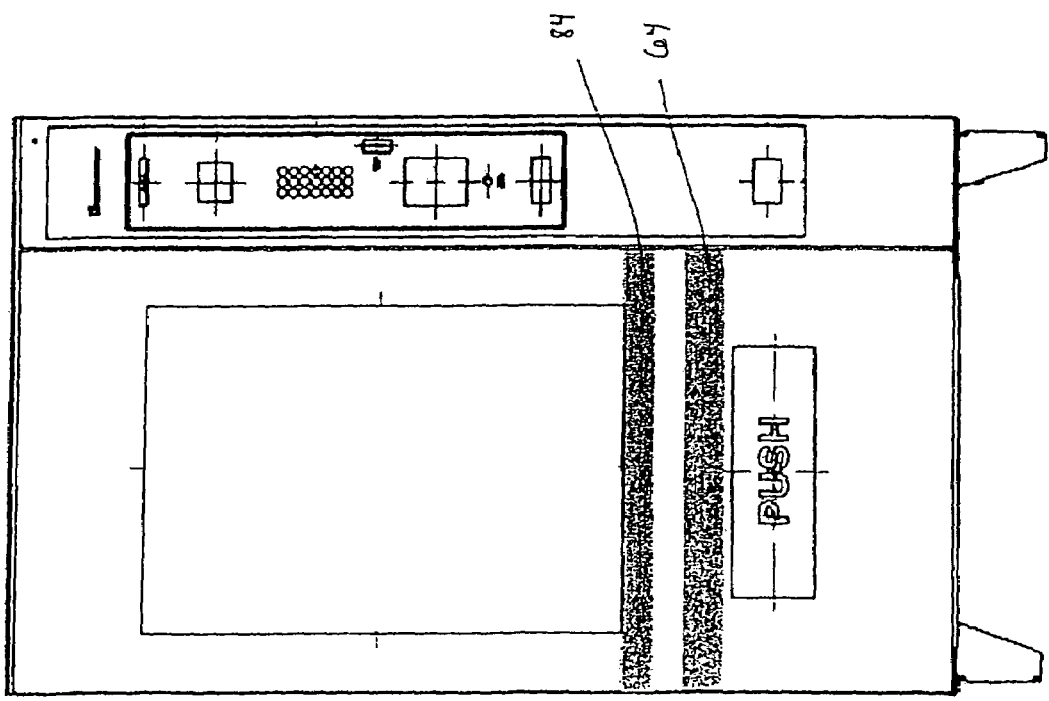

FIGS. 6a and 6b illustrate yet another embodiment of a product dispensing unit, wherein the main balun antenna 64 and the complementary balun antenna 84 are disposed above the dispensing bin 52. Like the product dispensing unit of FIGS. 5a and 5b, the main and supplemental balun antennas 64, 84 permit confirmation of the completion of transactions by watching for subtle time delays between balun antenna detections.

Figure 7:
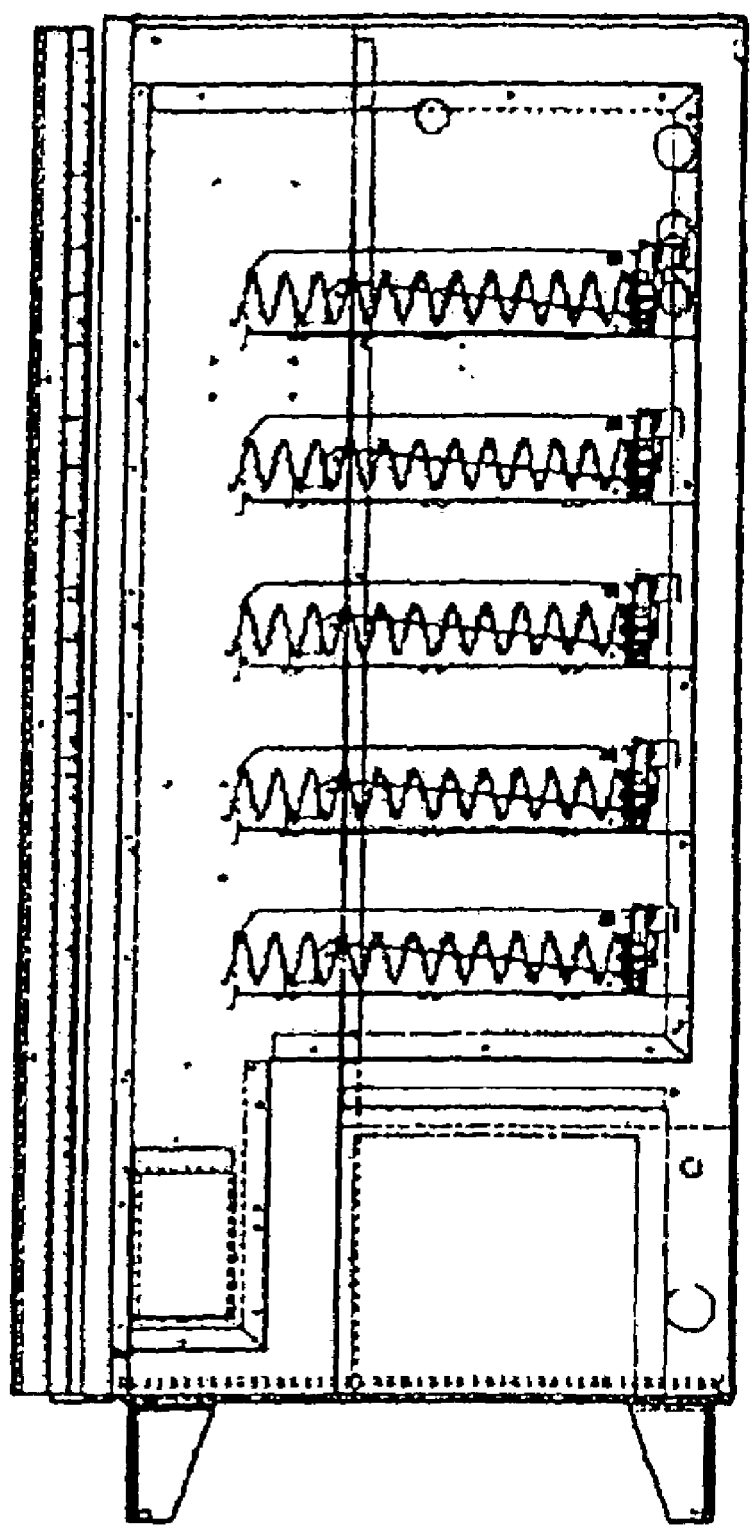
FIG. 7 is a side cross-sectional view of still yet another embodiment of a product dispensing unit.
Figure 8:
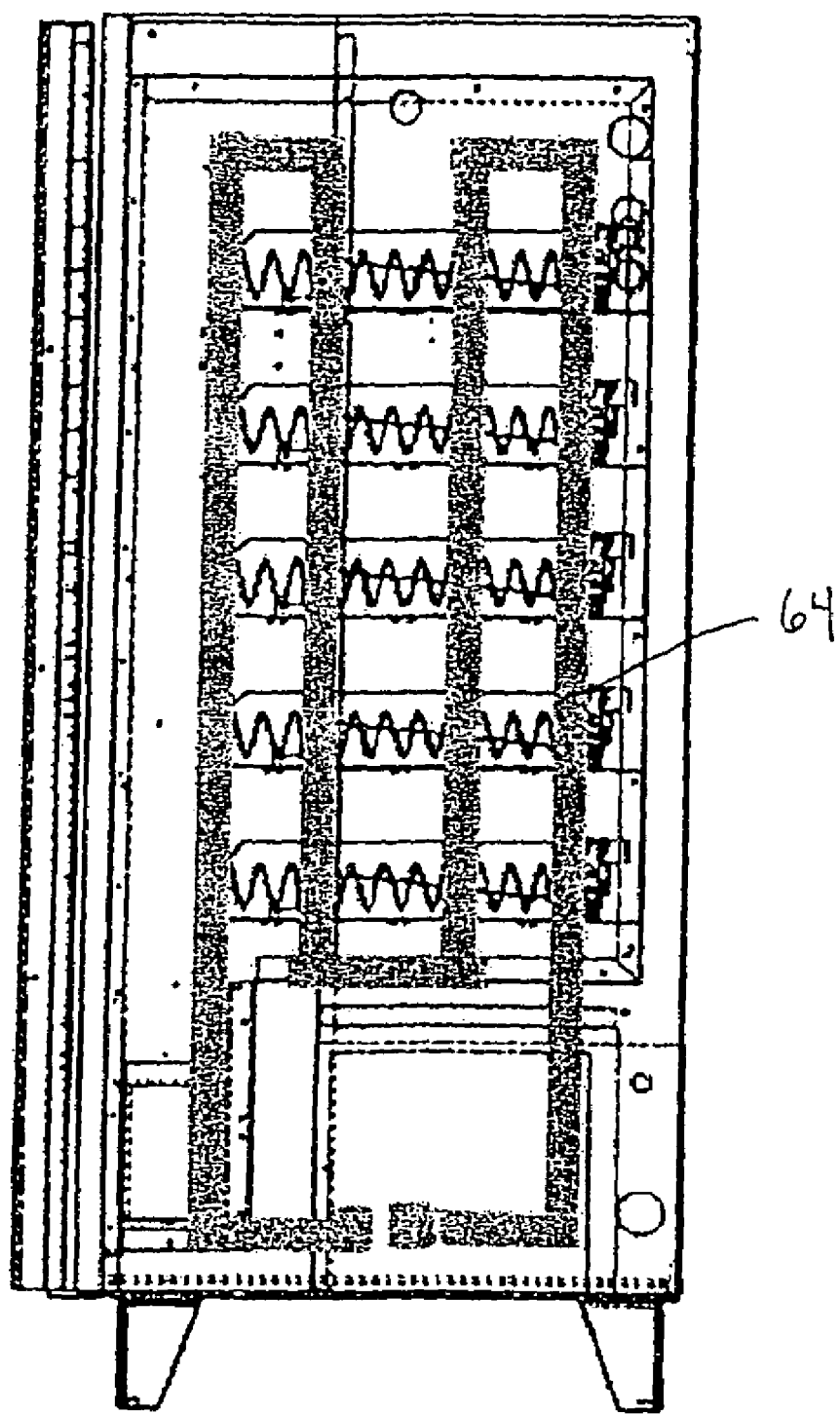
FIG. 8 is another side cross-sectional view of the product dispensing unit of FIG. 7.

FIGS. 7 and 8 show still yet another embodiment of a product dispensing unit, wherein the main balun antenna 64 is located on the side wall of the product dispensing unit 20. In this embodiment, similar to the first embodiment the main balun antenna 64 is not explicitly used to detect the dispensation of products from the dispensing machine 20. Rather, the product dispensing unit 20 deduces the dispensation of a product by comparing an inventory of held products prior to and after each transaction.

Figure 9:
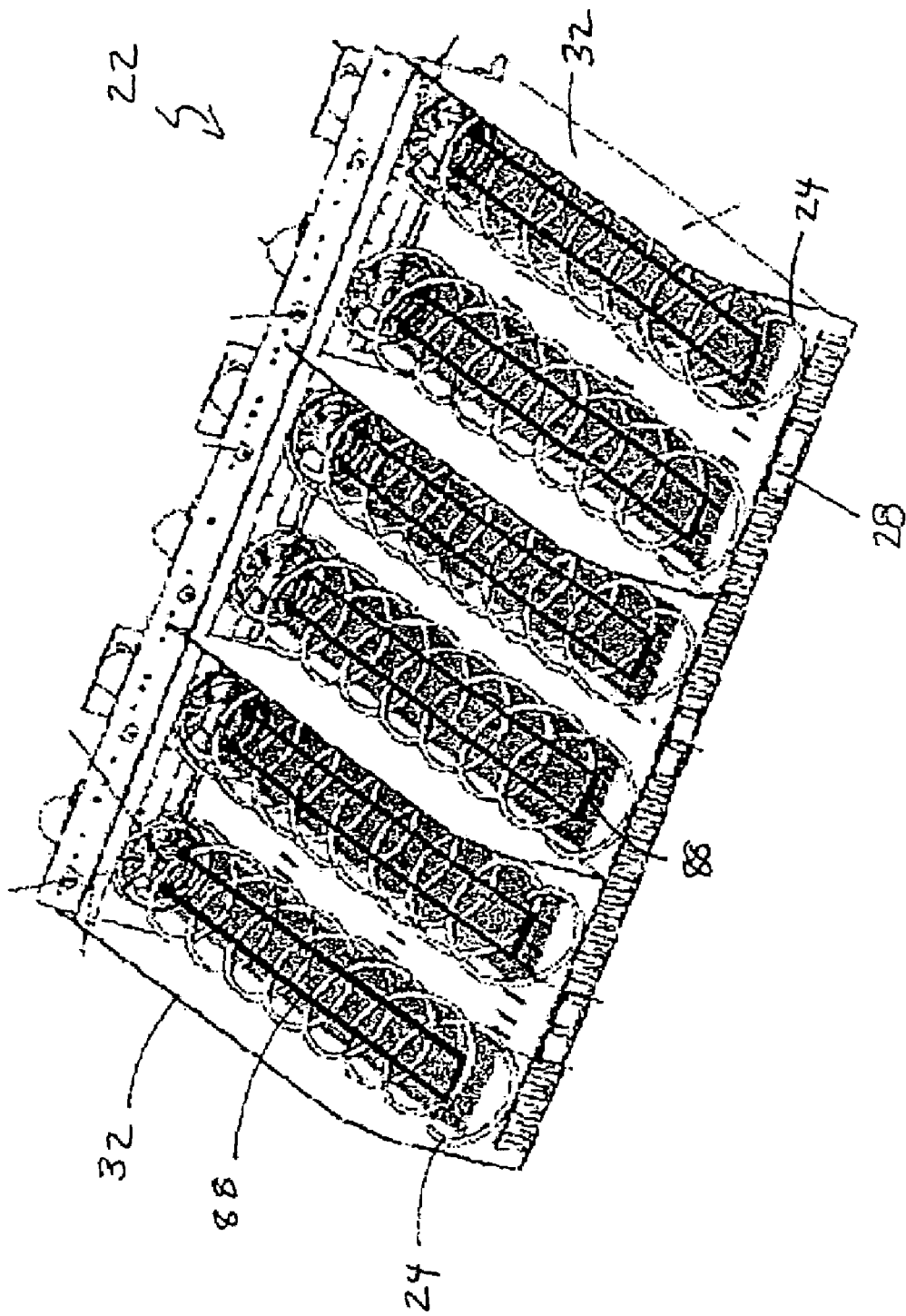
FIG. 9 is an isometric view of an alternative shelf assembly for use the product dispensing unit of FIGS. 1 to 8.

FIG. 9 illustrates an alternative shelf assembly for use in the above-described product dispensing units. In this shelf assembly, in addition to the supplementary antenna discharge spirals, supplementary antennas 88 are also established in the guide trays 28. Each additional supplementary antenna 88 includes an antenna wire extending straight along a line parallel to the axis of its associated discharge spiral 24. The additional supplementary antennas 88 cooperate with the supplementary antenna discharge spirals to amplify the interrogation signals of the main balun antenna 64.

Figures 10, 11A, 11B, 11C:
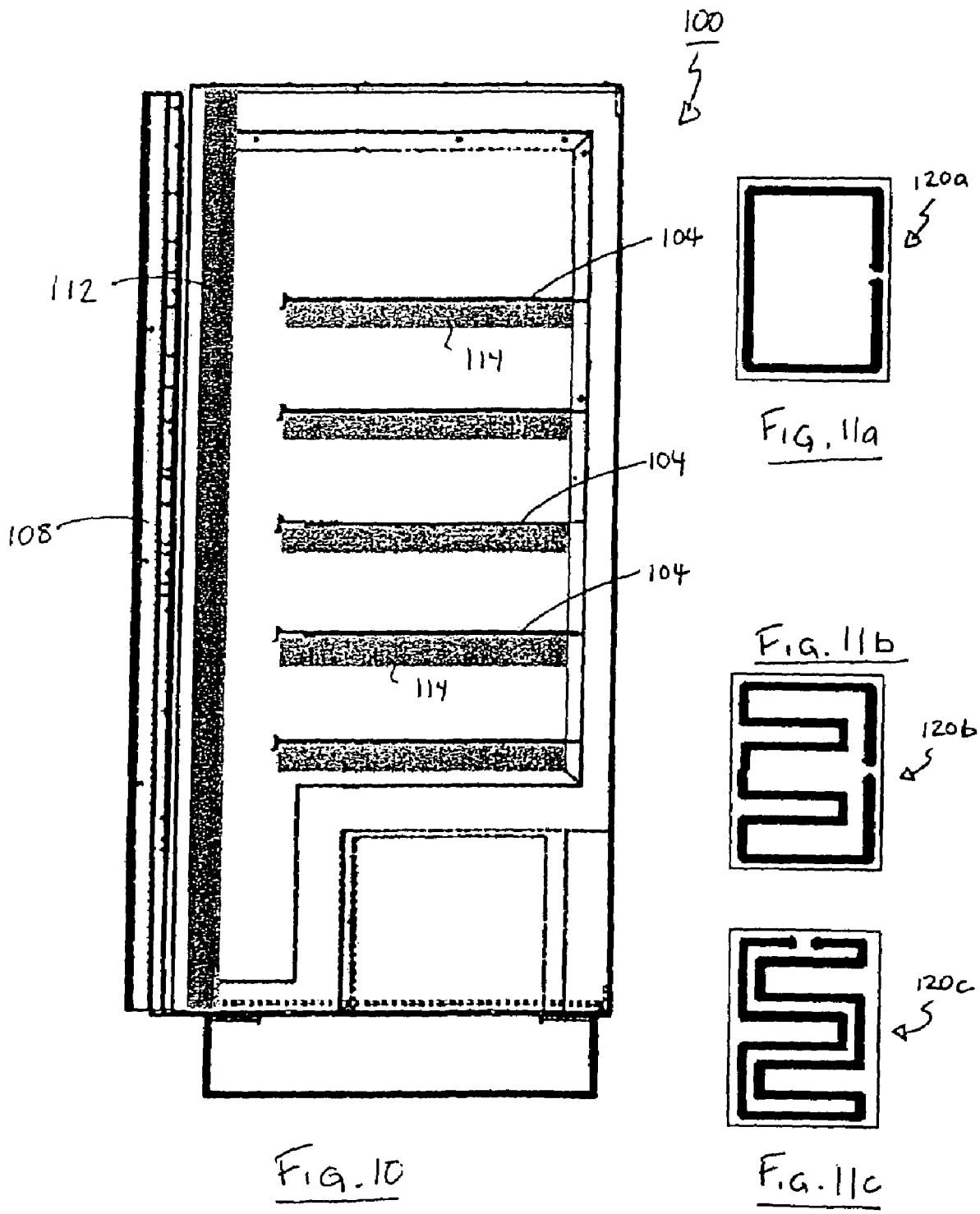
FIG. 10 is a side schematic cross-sectional view of a refrigerated dispensing unit.
FIGS. 11a to 11c show different supplementary antenna configurations for use in the refrigerated dispensing unit of FIG. 10.

FIG. 10 illustrates a medical supplies refrigerator 100 including a plurality of shelves 104 onto which medical supplies are to be placed. The refrigerator 100 has a door 108 for providing access to the contents of the refrigerator 100. A main balun antenna 112, which can be passive or active, is positioned about the door opening of the refrigerator 100.

The shelves 104 are constructed of plastics, such as polycarbonate, impacted styrene or acrylic, or any other suitable material known in the art. A supplementary antenna 114 is affixed to the underside of the shelves 104 and reads the RFID tags of products deposited or accumulated on the shelves through the shelf substrate.

FIGS. 11a to 11c show a variety of different supplementary antenna configurations 120a to 120c for the shelves 104. Supplementary antenna configuration 120a is most suitable when large products are stored in the refrigerator 100. Supplementary antenna configuration 120b is most suitable when medium-sized products are stored in the refrigerator 100 and supplementary antenna configuration 120c is most suitable when small products are stored in the refrigerator 100.

Figure 12C:
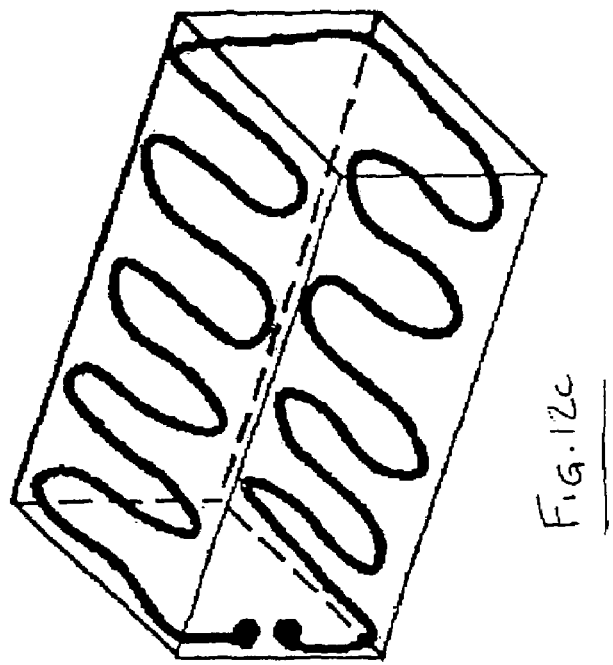
FIGS. 12a to 12c are isometric schematic views of different supplementary antenna configurations for use in product containing units such as for example cartons and/or boxes.
Figure 12D:
FIG. 12d is a top view of another supplementary antenna configuration for use in a carton and/or box.
Figure 12A:
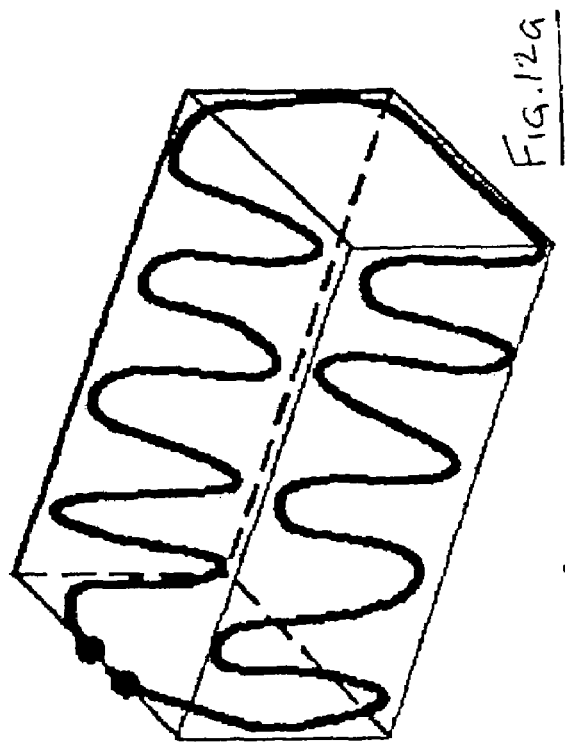
Figure 12B:
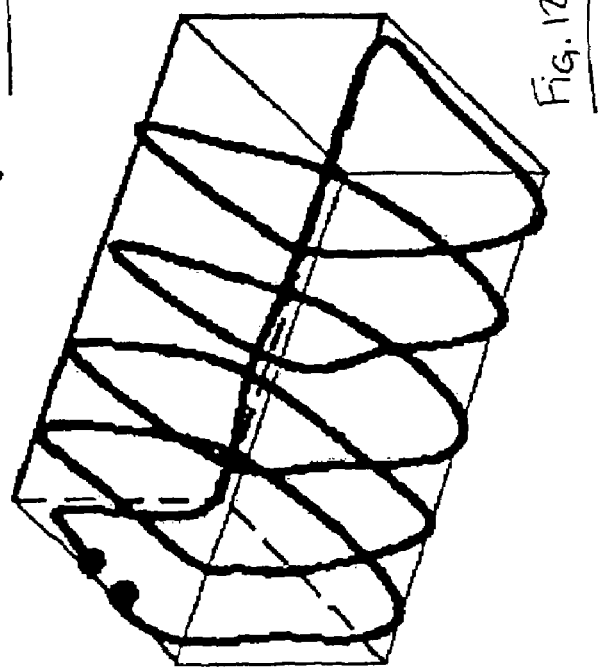

FIGS. 12a to 12d illustrate a number of different supplementary antenna configurations suitable for lining product containing units in the form of carbons and/or boxes to enable RFID tags on products held by such product containing units to be read without requiring the product containing units to be opened. The supplementary antenna shown in FIG. 12a follows a sinuous path along the sides of a box. FIG. 12b shows a supplementary antenna that follows a spiral path about the top, sides and bottom of the box. The supplementary antenna shown in FIG. 12c follows a sinuous path along the top and bottom of the box. In these configurations, interrogation of the product containing units using a main balun antenna causes the supplementary antennas to oscillate and, thus, cause the RFID tags on products resting on the shelves 104 to deliver up data no matter what configuration they lay in within the box. This approach works well with both passive and active RFID tagging as well as with active/passive coupled RFID tags. The supplementary antenna shown in FIG. 12d extends along a first straight line then turns to return along a second straight line parallel to the first.

Figure 13C:
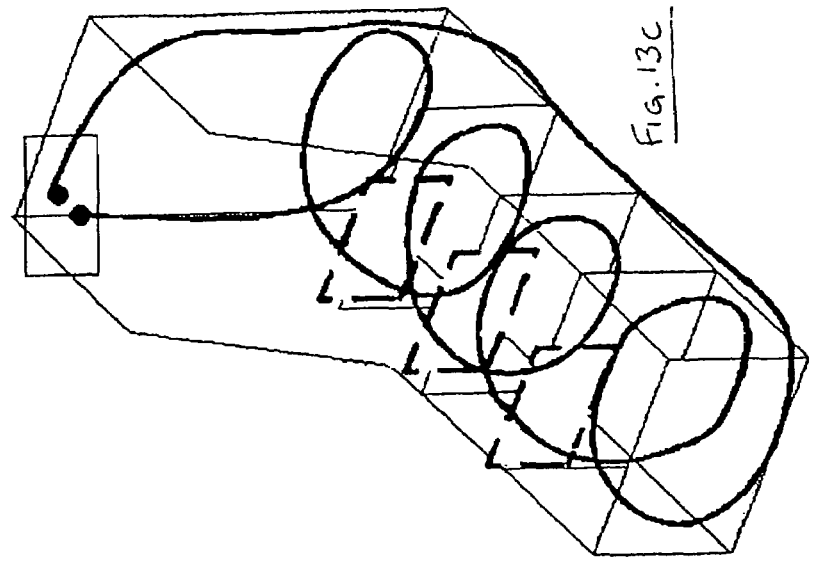
FIGS. 13a to 13c are isometric schematic views of different supplementary antenna configurations for use in partitioned cartons and/or boxes.
Figure 13A:
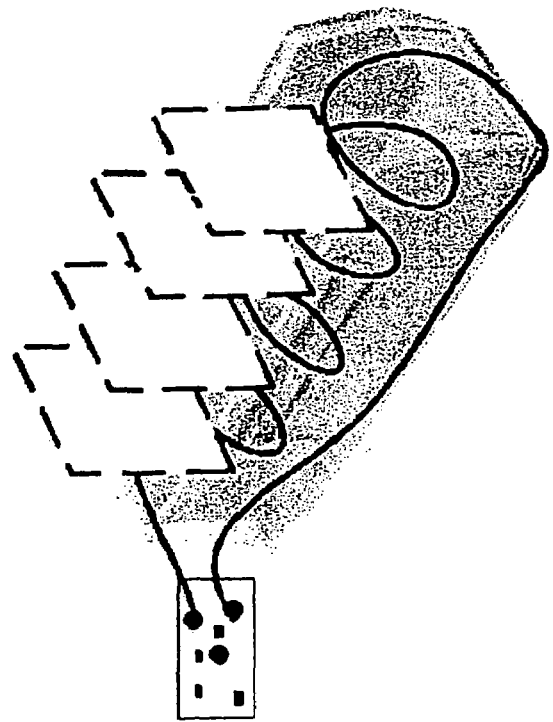
Figure 13B:
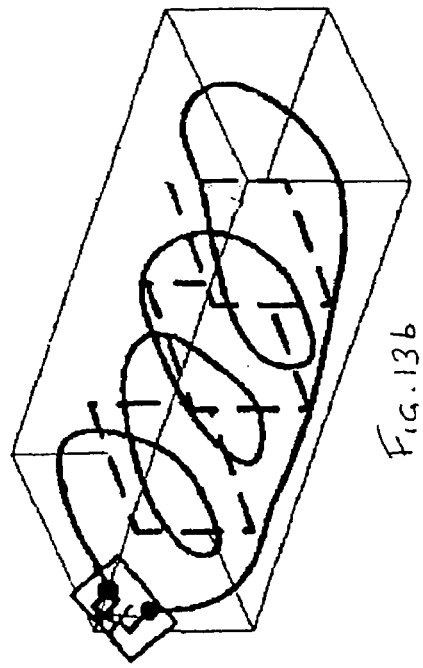

FIGS. 13a to 13c show a number of supplementary antenna configurations suitable for lining product containing units in the form of partitioned cartons. In each configuration, the supplementary antenna follows a spiral path through the carton along a first segment thereof. The supplementary antenna is affixed to dividers in the cartons as it spans from one side wall of the carton to the other. The other segment of the supplemental antenna follows a somewhat direct route back to the adjustable capacitor.

Figure 14B:
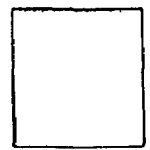
FIGS. 14a and 14b are front schematic views of yet further supplementary antenna configurations for use in partitioned cartons and/or boxes.
Figure 14A:
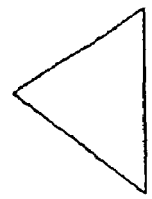

FIGS. 14a and 14b show yet alternative supplementary antenna configurations suitable for lining cartons. The supplementary antenna configuration shown in FIG. 14a is triangular, whereas the supplementary antenna configuration shown in FIG. 14b is rectangular. The triangular configuration of FIG. 14a is better suited for cartons holding products that have centrally located RFID tags, whereas the rectangular configuration of FIG. 14b is better suited for cartons holding products that have RFID tags located along their periphery.

Figure 15:
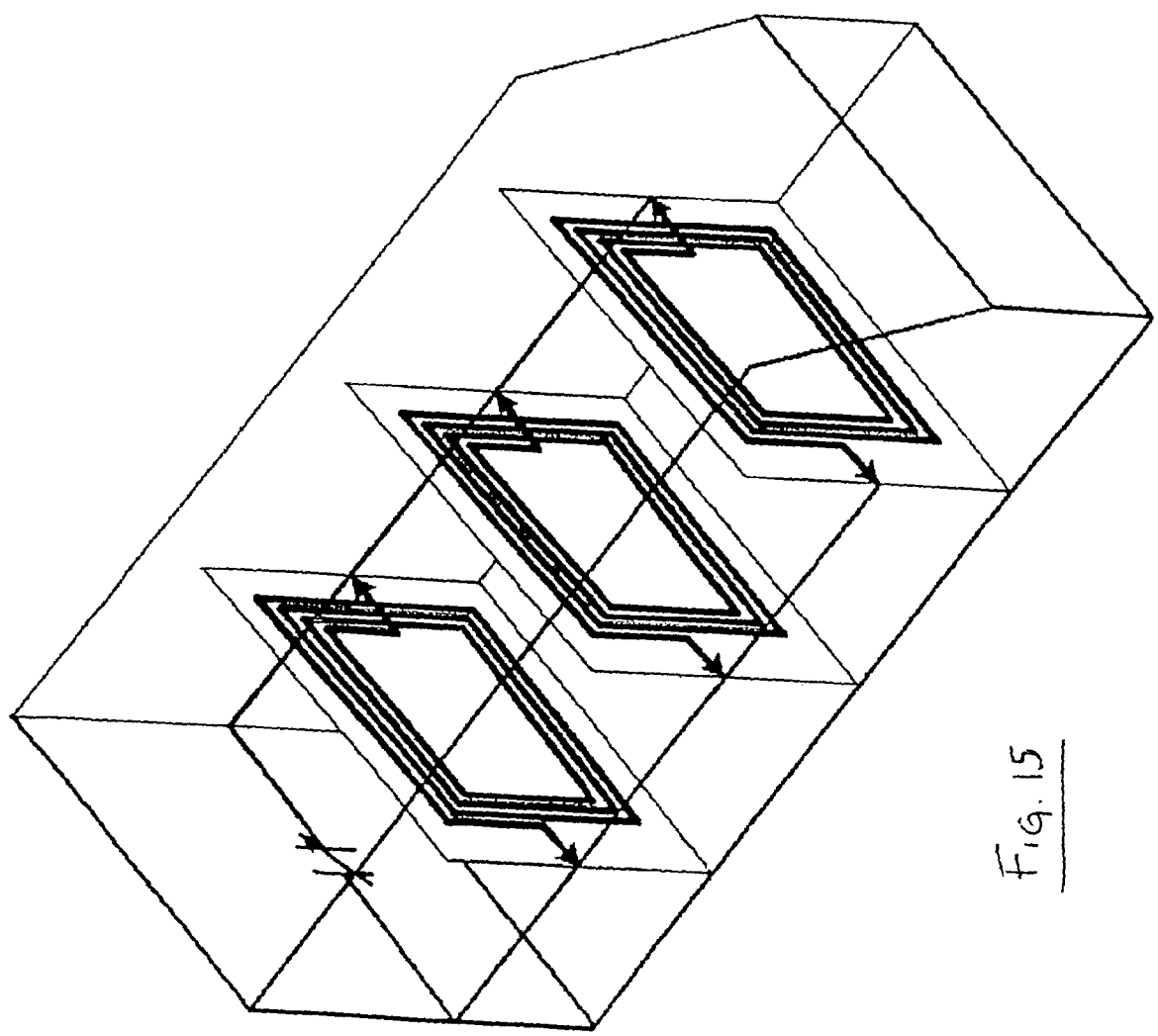
FIG. 15 is an isometric schematic view of yet another supplementary antenna configuration for use in a partitioned carton and/or boxes.

FIG. 15 shows yet another supplementary antenna configuration suitable for lining a partitioned carton. In this embodiment, the supplementary antenna includes a number of concentric spiral loops provided on each divider. The two ends of the loop on each divider extend to the lateral edges of the dividers and make contact with antenna wires embedded in the carton. The antenna wires are coupled to the adjustable capacitor at the back of the carton.

It can be desirable to construct the boxes and cartons in such a manner as understood in the art such that they withstand typical wear and tear and can be re-used repeatedly.

While the discharge spirals have been described as being made of stainless steel, other suitable materials for their construction will occur to those skilled in the art. For example, in some cases, a powdered coating is adhered onto the exterior of the discharge spirals and baked to set.

Spiral supplementary antennas can be inserted into boxes with products inside to permit more accurate interrogation of the RFID tags placed thereon.

The wireless communications link can be established over a wireless local area network ("WLAN") connection, a wireless wide area network ("WAN") connection such as via GSM, GPRS, Ardis network, or any other suitable wireless network known in the art. Of course, communications over wired networks can also be used.

Although embodiments have been described, those of skill in the art will appreciate that the variations and modifications may be made without departing from the spirit and scope thereof as defined by the appended claims.

What is claimed is:

1. A product dispensing unit comprising:
   a housing;
   at least one main antenna associated with said housing; and
   a plurality of supplementary antennae disposed within said housing, each supplementary antenna comprising a spiral having a plurality of loops configured to hold radio frequency identification (RFID)-tagged products to be dispensed from said housing, said supplementary antennae interrogating RFID-tagged products held thereby when excited by said main antenna, the spiral of each supplementary antenna being rotatable to advance RFID-tagged products held thereby along the spiral.

2. A product dispensing unit according to claim 1 wherein each supplementary antenna further comprises a capacitive element adjustable to tune the supplementary antenna generally to a frequency of the main antenna.

3. A product dispensing unit according to claim 1 wherein each supplementary antenna generates an omni-directional interrogation field during interrogation of said RFID-tagged products.

4. A product dispensing unit according to claim 3 wherein each supplementary antenna further comprises a capacitive element adjustable to tune the supplementary antenna generally to a frequency of the main antenna.

5. A product dispensing unit according to claim 4 further comprising a plurality of vertically spaced shelves within said housing, each of said shelves supporting a plurality of side-by-side supplementary antennae.

6. A product dispensing unit according to claim 5 further comprising a drive to rotate said spirals.

7. A product dispensing unit according to claim 6 further comprising guide rails adjacent opposite sides of each spiral.

8. A product dispensing unit according to claim 3 further comprising a processing unit communicating with said main antenna.

9. A product dispensing unit according to claim 8 wherein said processing unit uses RFID data output by said RFID-tagged products in response to interrogation by said supplementary antenna to determine RFID-tagged product inventory within said housing.

10. A product dispensing unit according to claim 9 wherein said processing unit generates a transaction when one of said RFID-tagged products is dispensed and transmits the transaction to a remote site.

11. A product dispensing unit according to claim 10 wherein said transaction is transmitted at least partially over a wireless network.

12. A product dispensing unit according to claim 11 wherein said processing unit compares RFID-tagged product inventory prior to and after one of said RFID-tagged products has been dispensed thereby to generate said transaction.

13. A product dispensing unit according to claim 11 wherein each dispensed RFID-tagged product falls from an end of the spiral holding the RFID-tagged product and falls under a force gravity into a bin.

14. A product dispensing unit according to claim 13 further comprising an additional supplemental antenna adjacent said bin, said additional supplemental antenna interrogating each RFID-tagged product proximate to the bin to confirm dispensing of the RFID-tagged product.

15. A product dispensing unit according to claim 14 wherein the main antenna and the additional supplementary antenna are positioned at spaced locations along a path of travel of a dispensed RFID-tagged product.

16. A product dispensing unit according to claim 10 wherein the housing is generally upright and comprises a door to permit the housing to be stocked with RFID-tagged products.

17. A product dispensing unit according to claim 16 wherein said main antenna generally encircles a periphery of the door.

18. A product dispensing unit according to claim 10 wherein said housing is refrigerated and wherein said RFID-tagged products are medical products.

19. A product dispensing unit according to claim 1 further comprising a plurality of vertically spaced shelves within said housing, each of said shelves supporting a plurality of side-by-side supplementary antennae.

20. A product dispensing unit according to claim 19 further comprising guide rails adjacent opposite sides of each spiral.

21. A product dispensing unit according to claim 19 further comprising a drive to rotate said spirals.

22. A product dispensing unit according to claim 21 further comprising a processing unit communicating with said main antenna.

23. A product dispensing unit according to claim 22 wherein said processing unit uses RFID data output by said RFID-tagged products in response to interrogation by said supplementary antenna to determine RFID-tagged product inventory within said housing.

24. A product dispensing unit according to claim 23 wherein said processing unit generates a transaction when one of said RFID-tagged products is dispensed and transmits the transaction to a remote site.

25. A product dispensing unit according to claim 24 wherein said transaction is transmitted at least partially over a wireless network.

26. A product dispensing unit according to claim 24 wherein said processing unit compares RFID-tagged product inventory prior to and after one of said RFID-tagged products has been dispensed thereby to generate said transaction.

27. A product dispensing unit according to claim 24 wherein each dispensed RFID-tagged product falls from an end of the spiral holding the RFID-tagged product and falls under a force gravity into a bin.

28. A product dispensing unit according to claim 27 further comprising an additional supplemental antenna adjacent said bin, said additional supplemental antenna interrogating each RFID-tagged product proximate to the bin to confirm dispensing of the RFID-tagged product.

29. A product dispensing unit according to claim 28 wherein the main antenna and the further supplementary antenna are positioned at spaced locations along a path of travel of a dispensed RFID-tagged product.

30. A product dispensing unit according to claim 24 wherein the housing is generally upright and comprises a door to permit the housing to be stocked with RFID-tagged products.

31. A product dispensing unit according to claim 30 wherein said main antenna generally encircles a periphery of the door.

32. A product dispensing unit according to claim 24 wherein said housing is refrigerated and wherein said RFID-tagged products are medical products.

33. A product dispensing unit according to claim 1 further comprising a processing unit communicating with said main antenna.

34. A product dispensing unit according to claim 33 wherein said processing unit uses RFID data output by said RFID-tagged products in response to interrogation by said supplementary antenna to determine RFID-tagged product inventory within said housing.

35. A product dispensing unit according to claim 34 wherein said processing unit generates a transaction when one of said RFID-tagged products is dispensed and transmits the transaction to a remote site.

36. A product dispensing unit according to claim 35 wherein said transaction is transmitted at least partially over a wireless network.

37. A product dispensing unit according to claim 35 wherein said processing unit compares RFID-tagged product inventory prior to and after one of said RFID-tagged products has been dispensed thereby to generate said transaction.

38. A product dispensing unit according to claim 34 wherein each dispensed RFID-tagged product falls from an end of the spiral holding the RFID-tagged product and falls under a force gravity into a bin.

39. A product dispensing unit according to claim 38 further comprising an additional supplemental antenna adjacent said bin, said additional supplemental antenna interrogating each RFID-tagged product proximate to the bin to confirm dispensing of the RFID-tagged product.

40. A product dispensing unit according to claim 38 wherein the main antenna and the additional supplementary antenna are positioned at spaced locations along a path of travel of a dispensed RFID-tagged product.

41. A product dispensing unit according to claim 34 wherein the housing is generally upright and comprises a door to permit the housing to be stocked with RFID-tagged products.

42. A product dispensing unit according to claim 41 wherein said main antenna generally encircles a periphery of the door.

43. A product dispensing unit according to claim 34 wherein each supplementary antenna further comprises an antenna wire extending generally parallel to the axis of the spiral.

44. A product dispensing unit according to claim 34 wherein said housing is refrigerated and wherein said RFID-tagged products are medical products.

45. A product dispensing unit according to claim 33 wherein said processing unit generates a transaction when one of said RFID-tagged products is dispensed and transmits the transaction to a remote site.

46. A product dispensing unit according to claim 45 wherein said transaction is transmitted at least partially over a wireless network.

* * * * *